United States Patent
Kang et al.

(10) Patent No.: US 8,194,127 B2
(45) Date of Patent: Jun. 5, 2012

(54) METHOD AND APPARATUS FOR MASKING SURVEILLANCE VIDEO IMAGES FOR PRIVACY PROTECTION

(75) Inventors: Kyun Ho Kang, Jinju-si (KR); Sung Ha Seo, Yongin-si (KR); Byung Jin Park, Seoul (KR); Jong Tae Choi, Yongin-si (KR)

(73) Assignee: LG Electronics Inc., Seoul (KR)

( * ) Notice: Subject to any disclaimer, the term of this patent is extended or adjusted under 35 U.S.C. 154(b) by 1326 days.

(21) Appl. No.: 11/593,480

(22) Filed: Nov. 7, 2006

(65) Prior Publication Data

US 2007/0115356 A1 May 24, 2007

(30) Foreign Application Priority Data

Nov. 7, 2005 (KR) .................. 10-2005-0105842

(51) Int. Cl.
*H04N 7/18* (2006.01)
(52) U.S. Cl. .................... 348/143; 348/161
(58) Field of Classification Search .............. None
See application file for complete search history.

(56) References Cited

U.S. PATENT DOCUMENTS

| | | | |
|---|---|---|---|
| 5,225,898 A * | 7/1993 | Imai et al. ............. | 348/624 |
| 5,831,669 A * | 11/1998 | Adrain ................. | 348/143 |
| 5,880,775 A * | 3/1999 | Ross ................... | 348/143 |
| 6,509,926 B1 * | 1/2003 | Mills et al. ............ | 348/143 |
| 6,707,486 B1 * | 3/2004 | Millet et al. ........... | 348/155 |
| 6,744,461 B1 * | 6/2004 | Wada et al. ............ | 348/143 |
| 7,382,896 B2 * | 6/2008 | Ito et al. .............. | 382/103 |
| 7,742,077 B2 * | 6/2010 | Sablak et al. ........... | 348/208.99 |
| 7,751,647 B2 * | 7/2010 | Pikaz ................. | 382/278 |
| 2005/0091311 A1 * | 4/2005 | Lund et al. ............ | 709/203 |
| 2006/0055777 A1 * | 3/2006 | Ito et al. .............. | 348/143 |
| 2008/0055409 A1 * | 3/2008 | Mars et al. ............ | 348/143 |

OTHER PUBLICATIONS

Specification of U.S. Appl. No. 60/590,505, Mars et al, filed Jul. 23, 2004.*

* cited by examiner

*Primary Examiner* — Joseph Ustaris
*Assistant Examiner* — Frederick Bailey
(74) *Attorney, Agent, or Firm* — Birch, Stewart, Kolasch & Birch, LLP

(57) ABSTRACT

The present invention makes a privacy protection area set on a video frame always match a masking block for the privacy protection area, thereby preventing video images taken from the privacy protection area from being exposed. One embodiment of the invention sets a masking zone corresponding to a privacy protection area on a taken video frame, keeps examining if the set masking zone does not match the privacy protection area, and adjusts the position of the masking zone on the video frame if it is determined that the masking zone does not match the privacy protection area, thereby preventing video signals taken from the initially set privacy protection area from being outputted.

24 Claims, 9 Drawing Sheets

RELATED ART

*RELATED ART*

*(x0,y0)*
*(x1,y1)*

*privacy area to mask (2b)*
*(x0,y0)*
*2a*
*(x1,y1)*

*RELATED ART*

METHOD AND APPARATUS FOR MASKING SURVEILLANCE VIDEO IMAGES FOR PRIVACY PROTECTION

This application claims the priority benefit of the Korean Patent Application No. 10-2005-0105842, filed on Nov. 7, 2005, which is hereby incorporated by reference as if fully set forth herein.

BACKGROUND OF THE INVENTION

1. Field of the Invention

The present invention relates to a method and apparatus for masking a part of video images taken with a surveillance camera for the purpose of privacy protection.

2. Description of the Related Art

A general surveillance camera can be panned or tilted by a pan/filter for changing the surveillance area. FIG. 1 shows panning and tilting operations of a surveillance camera according to the related art. A surveillance camera equipped with pan/tilt/zoom capabilities, which is generally referred to as the PTZ surveillance camera, comprises a camera unit 1a and a pan/tilter 1b for rotating the camera unit 1a horizontally or vertically. As shown, the pan/tilter 1b is attached to a place (e.g., the ceiling of a particular room) and the camera unit 1a is connected to the pan/tilter 1b.

The pan/tilter 1b can change the surveillance area of the camera unit 1a by tilting and rotating the camera unit 1a vertically or horizontally. If the surveillance camera is equipped with a zoom lens, the video image of an object under surveillance can be magnified or reduced by adjusting the zoom lens.

The surveillance camera may be equipped with privacy protection capability, which can mask a part of the video image taken from a surveillance area if the video image contains particular objects which require privacy protection such as a bathroom window, a gate to a particular place, etc. The size and position of the video block for masking is set up initially by the operator of the surveillance camera. The surveillance camera does not output the video image corresponding to the masked video block, thereby preventing a part of the video image from being viewed or recorded.

FIG. 2 is an example of the masking operation according to the related art. If a masking block 2a, which is specified by its edge coordinates (x0,y0) and (x1,y1) on the video frame, is set and a video image shown in FIG. 2B is taken from a surveillance area, the video image corresponding to the masking block 2a is made to be black or gray. As a result, the video image as shown in FIG. 2C is outputted by the surveillance camera.

As mentioned above, the surveillance area can be changed by the pan/tilter of the surveillance camera. Due to mechanical errors, however, the actual rotational displacement may not be the same as the intended pan/tilt angles. Further, such mechanical errors make the masking block 2a deviate from the initially set (actual) privacy protection area 2b as shown in FIG. 2D, if the camera is panned and/or tilted from the surveillance area in which the masking block for the privacy protection area is first set up and then returns to the original surveillance area. In this case, images taken from a part of the privacy protection area 2b may be exposed and recorded, which is a problem.

Moreover, even in the case of surveillance cameras not equipped with pan/tilt capabilities, the actual surveillance area may deviate slightly from the originally set surveillance area due to operating environments (e.g., wind or vibration). In this case, the privacy protection area cannot be masked accurately or completely by the masking block like the previous case and thus the same problem where a part of the privacy protection area is exposed occurs.

SUMMARY OF THE INVENTION

It is an object of the present invention to provide a method and apparatus for preventing video images taken from a protection area from being exposed by making the protection area set on a surveillance video image always match a masking block for the protection area.

It is another object of the present invention to provide a method and apparatus for providing a surveillance image, which address the limitations and disadvantages associated with the related art.

At least one embodiment of the invention sets a masking zone corresponding to a privacy protection area on a taken video frame, keeps examining if the set masking zone does not match the privacy protection area, and adjusts the position of the masking zone on the video frame if it is determined that the masking zone does not match the privacy protection area.

In one embodiment of the invention, the shape of the masking zone is rectangular.

One embodiment of the invention periodically obtains video data contained in the set masking zone from the video frame, calculates the correlation between the obtained video data and the video data obtained from the masking zone and stored when the masking zone is set, and determines if the masking zone does not match the protection area based on the calculated correlation.

Another embodiment of the invention periodically obtains video data contained in a predetermined reference zone from the video frame, calculates the correlation between the obtained video data and the video data obtained from the predetermined reference zone and stored when the masking zone is set, and determines if the masking zone does not match the protection area based on the calculated correlation.

In one embodiment of the invention, the shape of the reference zone is rectangular.

In one embodiment of the invention, the correlation is a value determined based on the sum of products of corresponding pixel values of two video data groups obtained from the zone at different times, the averages of pixel values of two video data groups, or the standard deviations of pixel values of two video data groups.

In one embodiment of the invention, only partial components of the video data of each video data group (e.g., luminance-removed signal or high-frequency components of the luminance signal) are used to calculate the correlation between two video data groups.

In one embodiment of the invention, if it is determined that the masking zone does not match the protection area, the current video frame is searched for a zone containing video data which has the highest correlation with the video data which was obtained and stored when the masking zone was set and the position of the found zone is set as the position of the masking zone.

In one embodiment of the invention, the position of the masking zone on the video frame is adjusted again based on the amount of horizontal and/or vertical movement of the view angle.

In one embodiment of the invention, the position of the masking zone on the video frame is adjusted again based on the shooting magnification.

According to an aspect of the present invention, there is provided a method for masking a surveillance image taken with a camera including (a) setting a masking zone corresponding to a protection area on a video frame being taken with the camera, (b) determining whether the masking zone is deviated from the protection area, and (c) adjusting a position of the masking zone on the video frame if it is determined that the masking zone is deviated.

According to another aspect of the present invention, there is provided an apparatus for masking a surveillance image taken with a camera, including an opto-electric processing unit to convert an input optical ray into electrical video frames, a controller to set a masking zone corresponding to a protection area on a video frame, to determine whether the masking zone is deviated from the protection area, and to adjust a position of the masking zone on the video frame if it is determined that the masking zone is deviated from the protection area, and a masking unit for blocking the video signal corresponding to the set masking zone on the video frame.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention. In the drawings.

DETAILED DESCRIPTION OF PREFERRED EMBODIMENTS

In order that the invention may be fully understood, preferred embodiments thereof will now be described with reference to the accompanying drawings.

Figure 3:
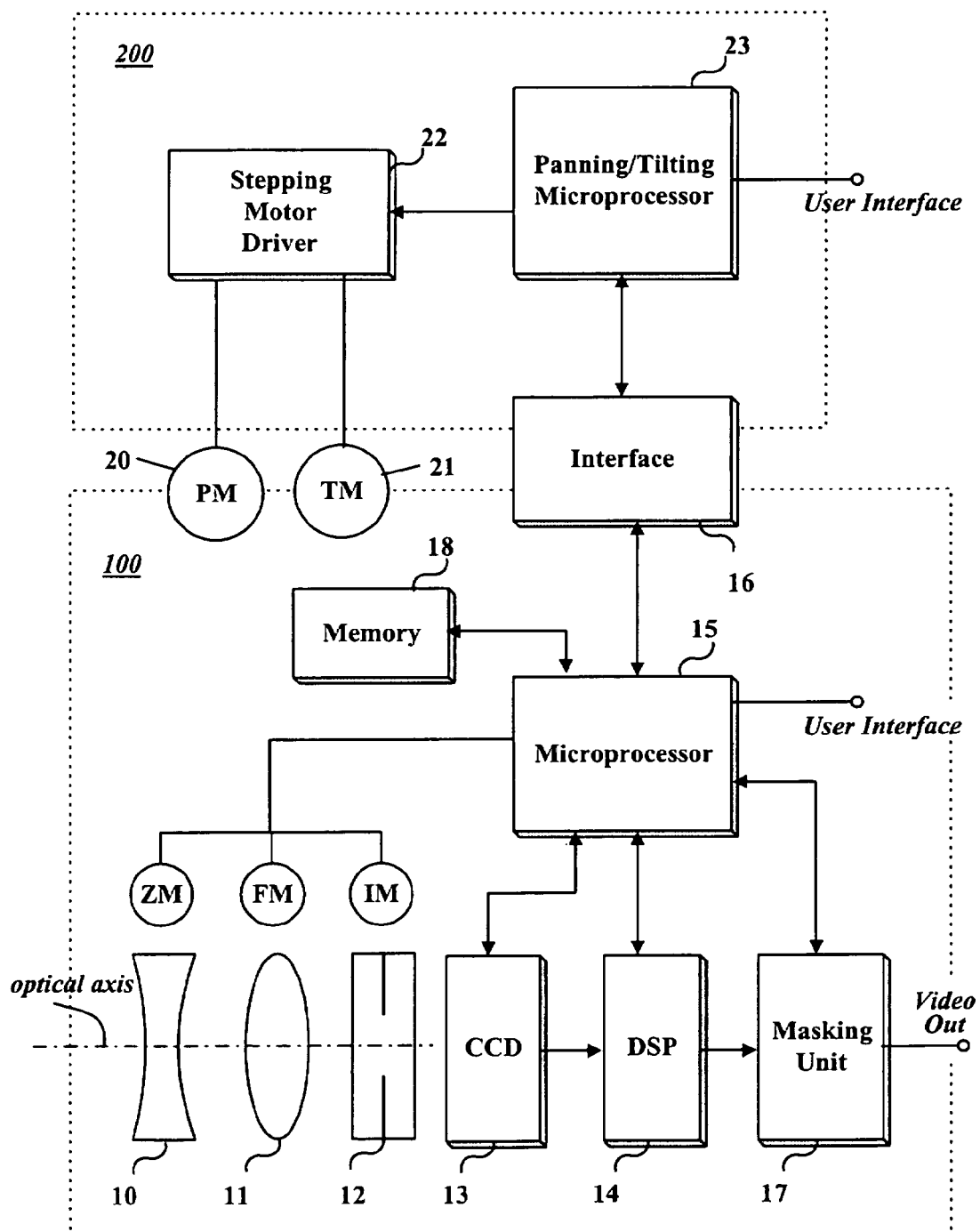
FIG. 3 illustrates a block diagram of a surveillance camera in accordance with one embodiment of the invention.

FIG. 3 is a block diagram of a surveillance camera in accordance with one embodiment of the present invention. Referring to FIG. 3, the camera comprises a camera unit 100 and a pan/tilter unit 200. The camera unit 100 comprises a zoom lens 10, a focus lens 11, an iris diaphragm 12, a CCD 13, a digital signal processing unit (DSP) 14, a microprocessor 15 for performing the adaptive masking operation according to the present invention and for re-setting the position of a masking zone due to a change in the surveillance area, an interface 16, a masking unit 17, and a memory 18. The pan/tilter unit 200 comprises a pan motor 20, a tilt motor 21, a stepping motor driver 22 for driving the motors 20 and 21, and a panning/tilting microprocessor 23. All the components of the surveillance camera are operatively coupled and configured. The surveillance camera can further include other known components and capabilities.

In one example, both the pan motor 20 and the tilter motor 21 are stepping motors, but can be other types. The panning/tilting microprocessor 23 controls the rotation angles of the pan motor 20 and tilt motor 21 via the stepping motor driver 22, and examines a change in the surveillance area of the camera unit 100 by monitoring the rotation angles of the motors 20 and 21.

Figure 1:
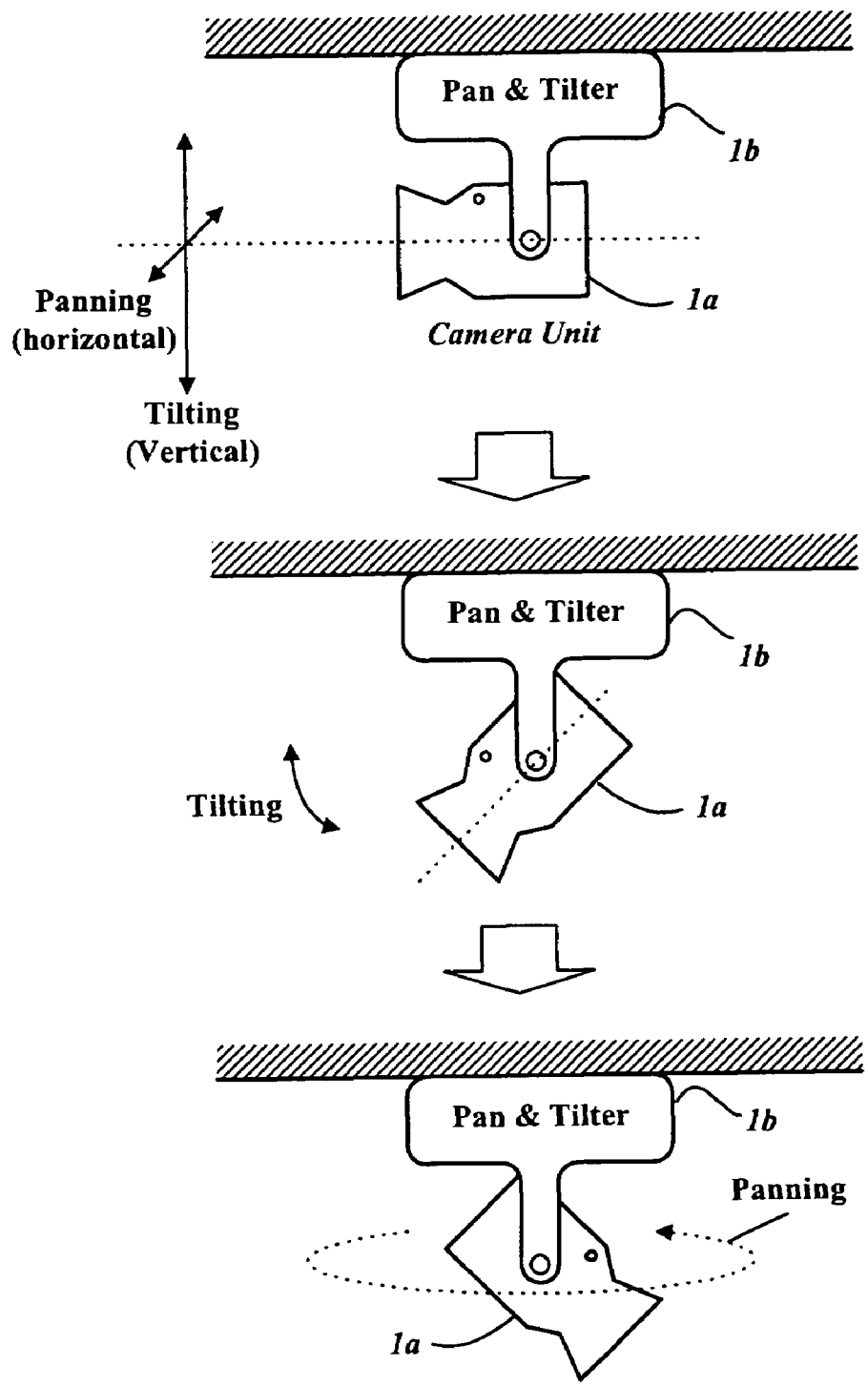
FIG. 1 illustrates an example of panning/tilting operations of a surveillance camera according to the related art.
Figure 2A:
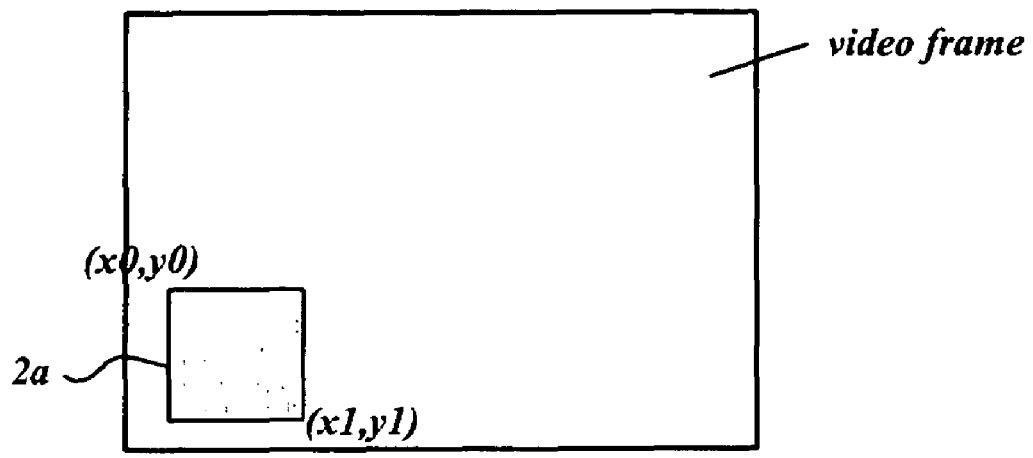
FIGS. 2A through 2D illustrate a masking block set on a video frame, an output surveillance image with a part thereof masked by the masking block, and an example in which the masking block does not match the privacy protection area according to the related art.
Figure 2B:
Figure 2C:
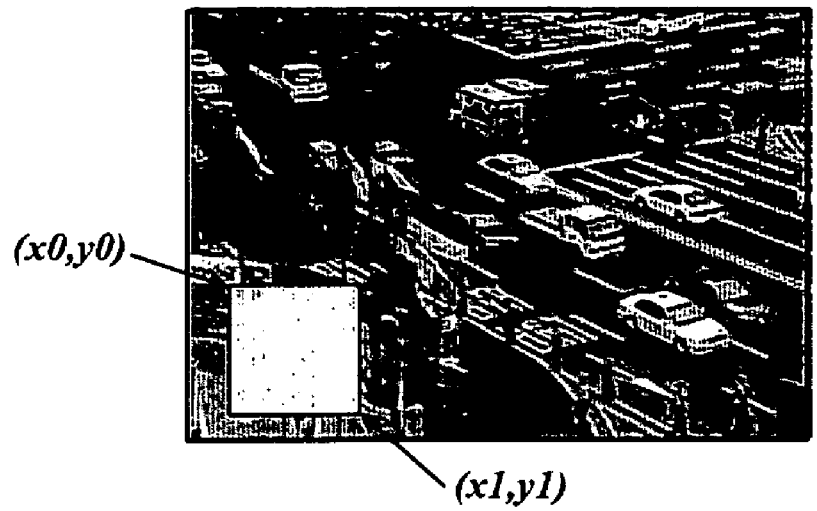
Figure 2D:
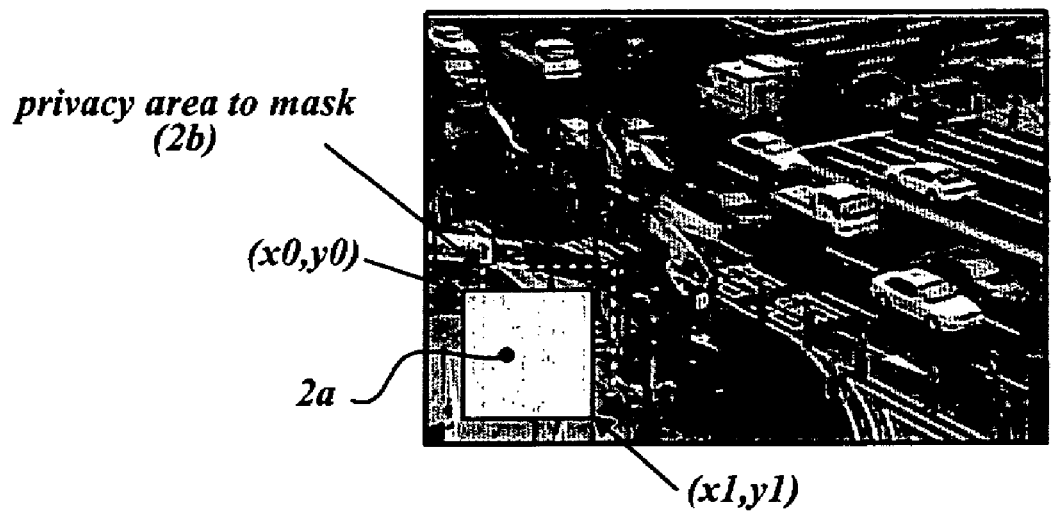

The microprocessor 15 of the camera unit 200, e.g., responsive to a user's request, sets a masking zone (or masking block) on the video frame in the masking unit 17 (e.g., as shown in FIG. 2A). In this embodiment of the invention, a rectangular/square masking block specified by two edge coordinates (x0,y0) and (x1,y1) is used as the masking zone. However, the shape of the masking zone does not need to be rectangular. Any shape which can be specified by coordinate information or numbers may be employed as the masking zone. For example, the masking zone can be a circle which is specified by a center coordinate and a radius. Also, multiple masking zones may be specified for one video frame/surveillance area.

When setting the masking block, the microprocessor 15 stores the current phase information about the camera unit 100 (e.g., the pan angle $\theta p$ and tilt angle $\theta t$), as the reference pan angle $\theta pr$ and tilt angle $\theta tr$, respectively. The current pan angle $\theta p$ and tilt angle $\theta t$ are received by the microprocessor 15 from the panning/tilting microprocessor 23 via the interface 16. The microprocessor 15 then communicates the set masking block information and the masking unit 17 then replaces the video signal corresponding to the set masking block with a video signal yielding a single color (e.g., gray or black) or some blocking/masking signal.

Figure 4:
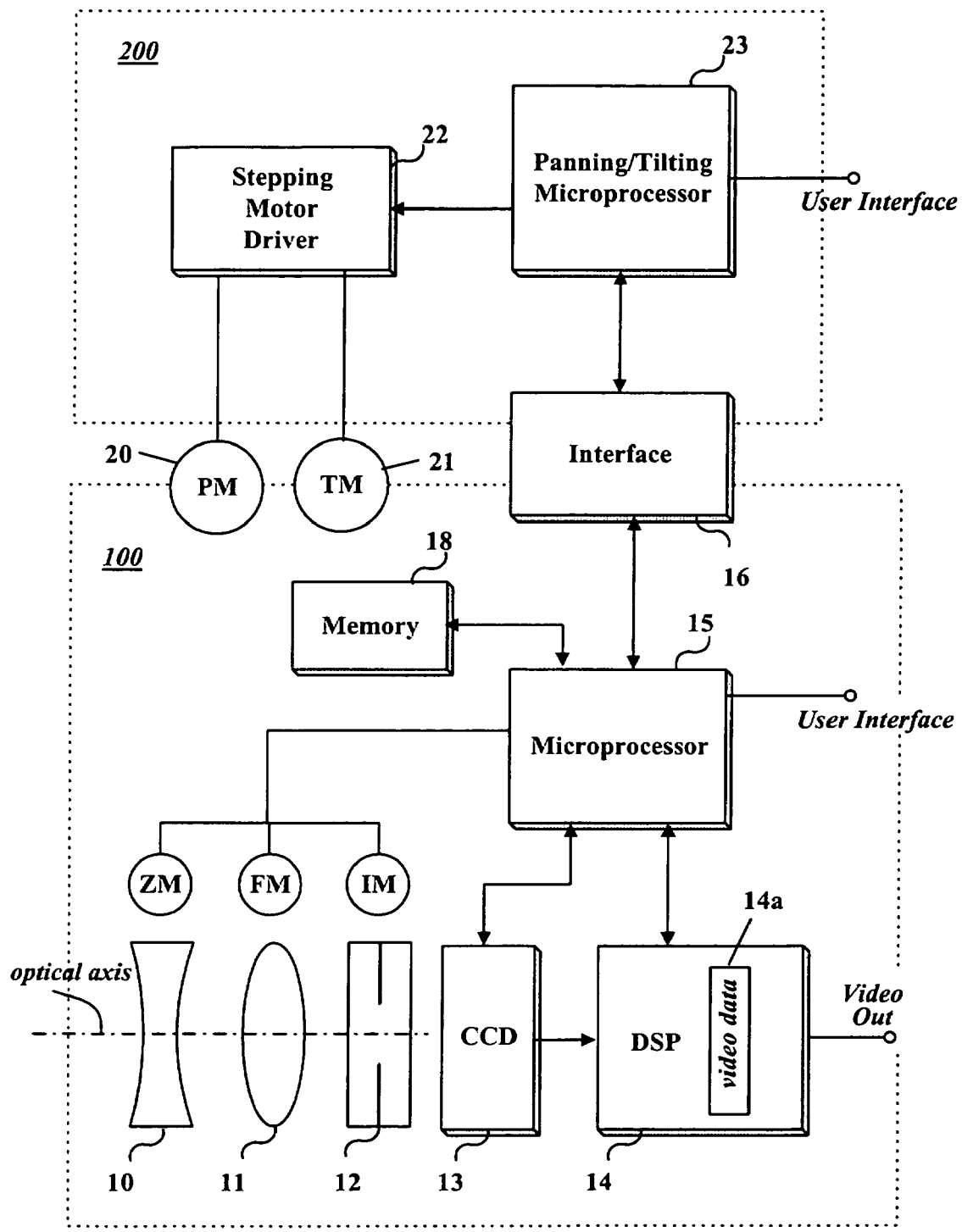
FIG. 4 illustrates a block diagram of a surveillance camera in accordance with another embodiment of the invention.

In another embodiment of the invention as shown in FIG. 4, the camera unit 100 is not equipped with a separate masking unit. Instead, the microprocessor 15 replaces video data corresponding to the set masking block with gray or black pixel data, the video data being stored in a buffer 14a included in the digital signal processing unit 14 as shown in FIG. 4. Because the video data stored in the buffer 14a is converted into video signals, the video image taken with the surveillance camera is outputted with the image corresponding to the masking block removed or masked.

In the embodiments of FIGS. 3 and 4, the microprocessor 15 provides the edge coordinates (x0,y0) and (x1,y1) of the masking block corresponding to the set privacy protection area on the video frame to the digital signal processing unit 14, receives the pixel values corresponding to the privacy protection area from the digital signal processing unit 14, and stores the received pixel values in the memory 18. Thereafter, the microprocessor 15 compares the current values of the pixels in the masking block {(x0,y0)~(x1,y1)} with the values of the corresponding pixels stored in the memory 18 to obtain a correlation therebetween at a predetermined interval (e.g., 1 minute).

If the calculated correlation is lower than a predetermined limit, the microprocessor 15 determines that the current surveillance area deviates from the initially set surveillance area, and moves the position of the masking block on the video frame to {(x0',y0'),(x1',y1')}. This process will be referred to as the adaptive adjustment of the position of the masking block hereinafter.

The description above is based on the assumption that the area under surveillance is fixed. If the surveillance area is changed intentionally by the operator via the pan/tilter 200, the microprocessor 15 re-sets the position of the masking block on the video frame accordingly. Then the microprocessor 15 periodically calculates the correlation between the current pixel values in the masking block and the corresponding pixel values stored in the memory 18 and performs the adaptive adjustment of the position of the masking block, periodically, continuously, or as needed.

Figure 5:
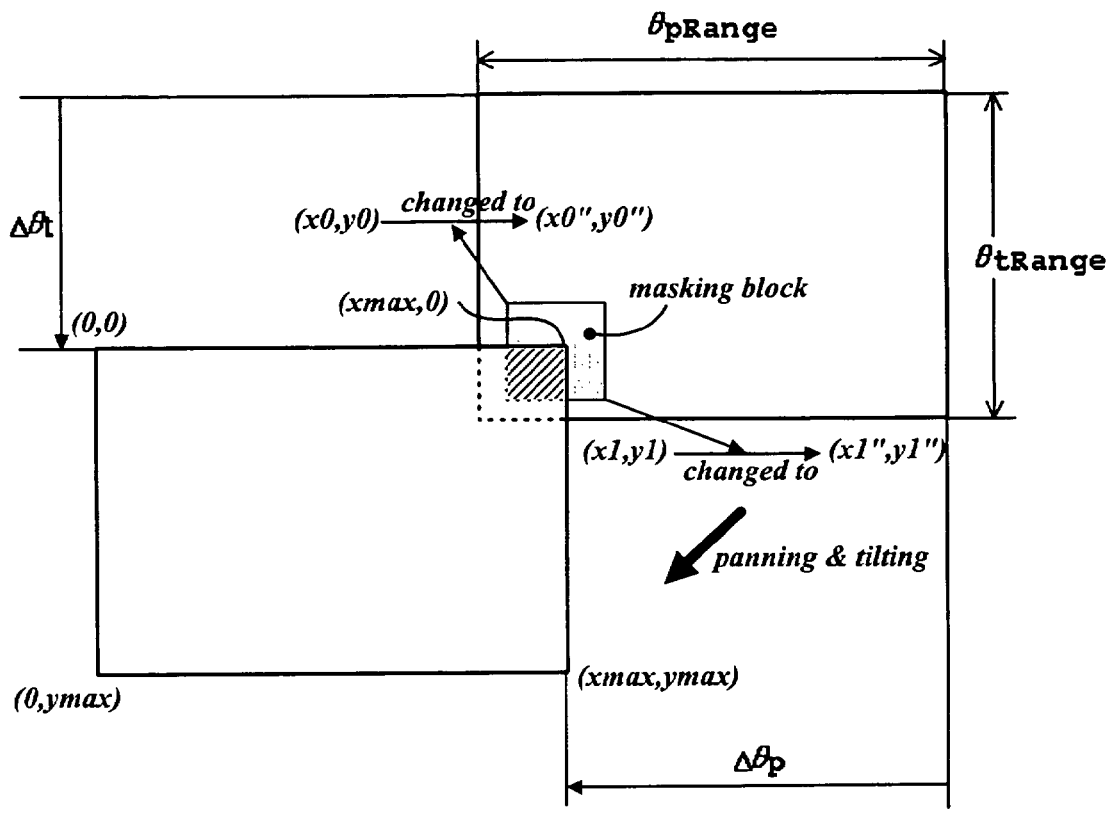
FIG. 5 illustrates an example of re-setting the position of the masking block executed when the surveillance area is intentionally changed by the horizontal and vertical rotation of the camera according to the present invention.

FIG. 5 shows an example of re-setting the position of the masking block performed when the surveillance area is intentionally changed (e.g., by the user) according to the present invention. If the surveillance area has been changed by the rotation of the camera unit 100 by the pan/tilter 200 from the reference phase (θpr,θtr) to an arbitrary phase (θp,θt), the left upper position of the masking block moves from (x0,y0) to (x0",y0") where x0"=x0−NpL·Δθp/θpRange, y0"=y0−$N_L$·Δθt/θtRange, Δθp=θp−θpr, and Δθt=θt−θpt. θpRange and θtRange represent the horizontal and vertical view angles of the focus lens 11, respectively. NpL is the number of pixels per horizontal line and $N_L$ is the number of horizontal lines on the video frame. Likewise, the right lower position of the masking block moves from (x1,y1) to (x1",y1"). If the magnification of the zoom lens 10 changes, θpRange and θtRange change in inverse proportion to the magnification thereof.

In the case where the magnification of the zoom lens 10 changes, the microprocessor 15 re-sets the coordinates of the masking block such that the difference between the coordinates of the masking block and the center of the video frame is in proportion to the change in the magnification.

If the newly set masking block goes outside the boundary of the video frame, the coordinates information is preserved but the masking operation and the adaptive adjustment of the position of the masking block according to the calculated correlation according to the present invention is performed only using the pixel data contained in the video frame.

For example, if a part of the new masking block obtained by the panning/tilting operation goes outside the boundary of the video frame in the upper right direction as shown in FIG. 5, the sub-block specified by (x0",0) and (xmax, y1"), which is the oblique line region, is used for the calculation of the correlation. In this case, the entire pixel data of the initially captured video block stored in the memory 18 is not used but only the pixel data corresponding to the sub-block is used for the calculation of the correlation.

Figure 6:
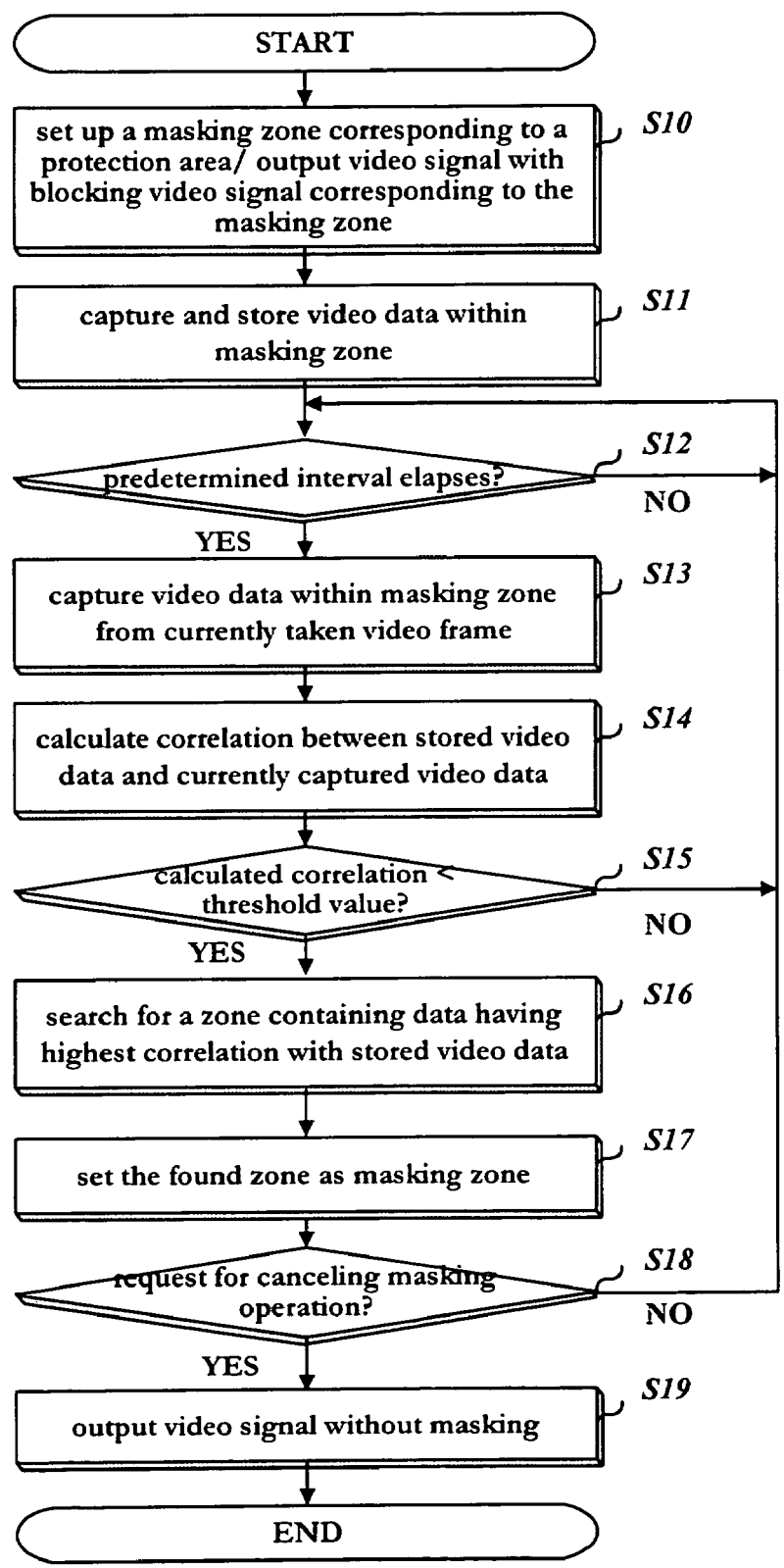
FIG. 6 illustrates a flow diagram of the method for masking surveillance video images in accordance with one embodiment of the invention.

FIG. 6 shows a flow diagram of the method for masking surveillance video images in accordance with one embodiment of the invention. The flow diagram to be described below assumes that the surveillance area is not changed intentionally (e.g., by the user) by panning/tilting. However, even if the surveillance area is intentionally changed by panning/tilting operations, the flow diagram can be applied simply after the masking block is adjusted by the aforementioned method. Such procedure is sufficiently straightforward and requires no additional creativity and therefore the procedure is not described here with a separate flow diagram. The method of FIG. 6 is implemented by the surveillance camera of FIG. 3 or 4, but can be implemented by other suitable device or system.

Figure 7A:
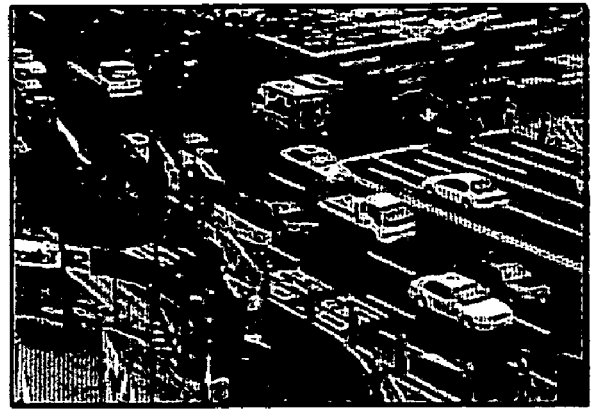
FIGS. 7A through 7D illustrate a masking block set on a video frame, an output surveillance image with a part thereof masked by the masking block, and an example for adjusting the position of the masking block when the masking block does not match the privacy protection area according to the present invention.
Figure 7B:
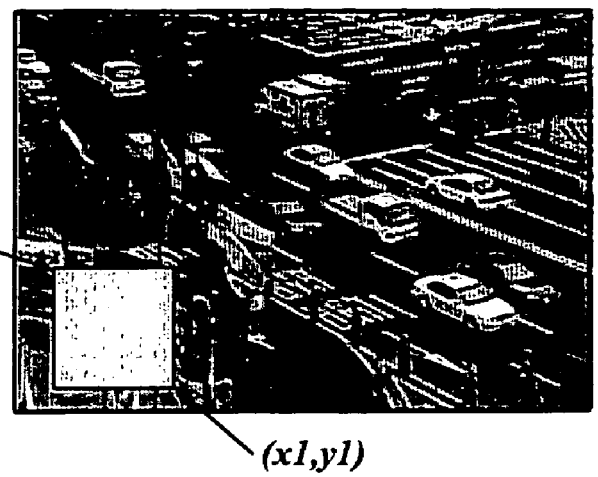

Now, referring to FIG. 6, the microprocessor 15, e.g., responsive to a user's request, sets the coordinates of a masking block in the masking unit 17 (or in the DSP 14 if a separate masking unit is not provided). The masking unit 17 masks a part of a taken video image as shown in FIG. 7A to generate an output video image as shown in FIG. 7B wherein the image block corresponding to the set masking block is masked (S10).

Then the microprocessor 15 captures the initial pixel values X in the masking block via the digital signal processing unit 14 by providing the coordinates of the masking block for the digital signal processing unit 14, and stores the obtained pixel values X in the memory 18 (S11).

After storing the initial pixel data (X) contained in the masking block, the microprocessor 15 performs the adaptive adjustment of the position of the masking block at a predetermined interval (e.g., every 1 minute) or as desired. Each time the interval elapses (S12), the microprocessor 15 makes a request for current pixel values X* in the set masking block to the digital signal processing unit 14, obtains the pixel values X*, and calculates the correlation between the pixel values X stored in the memory 18 and the current pixel values X* received from the digital signal processing unit 14 (S14). Because any of many known methods for calculating the correlation can be utilized, the selection of one method does not limit the spirit of the present invention. Therefore, all modifications and variations using methods for calculating the correlation which are not described in the present invention are to be considered to fall within the spirit and scope of the invention.

In one example of the invention, the correlation coefficient sim(X,X*) is calculated by sim $$(X, X^*) = \frac{X^* \times X^T}{\sqrt{X^* \times X^{*T}}},$$

wherein $X^T$ is the transpose of X. Because the pixel values in the masking block are represented by a matrix, one of the two matrices X and X* is transposed before multiplication so as to multiply pixel values of the same position.

The correlation coefficient has the highest value probabilistically when the two matrices are identical, i.e., all the corresponding pixel values in the two matrices are identical. As a result, it is determined whether the calculated correlation coefficient is less than a predetermined limit. For example, if R is the correlation coefficient calculated by R $$\left( = \frac{X \times X^T}{\sqrt{X \times X^T}} \right)$$

where X is the matrix of initial pixel values, it is determined whether the calculated correlation coefficient is less than 90% of R, i.e., 0.95R. R and 0.95 are a simple example for obtaining the predetermined limit and therefore different limits can be used.

Figure 7C:
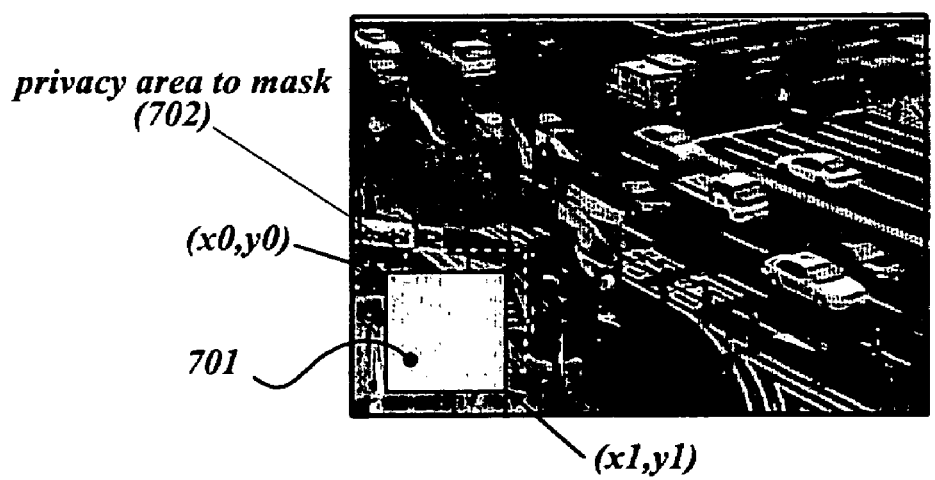
Figure 7D:
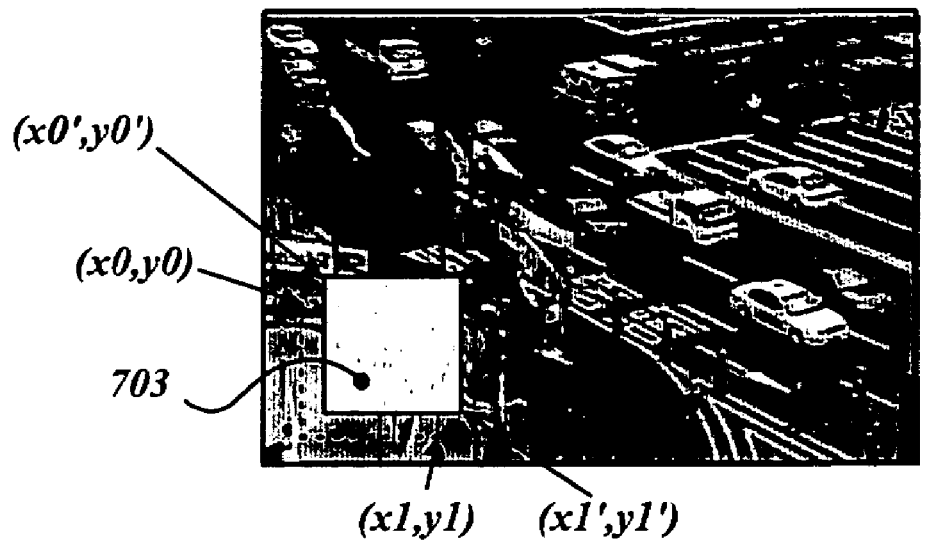

If the calculated correlation coefficient is less than the predetermined limit (S15), it is determined (e.g., by the microprocessor 15), as illustrated in FIG. 7C, that the current masking block 701 does not match the initially set privacy protection area 702 (in other words, the current masking block 701 is deviated from the initially set privacy protection area 702) and a video block corresponding to the initially set privacy protection area is searched from the current input video frame (S16). This search operation is conducted by repeating the process of moving the masking block by a predetermined distance (e.g., 2 pixels/lines) on the video frame and calculating the correlation between the current pixel data in the new masking block and the pixel data X stored in the memory 18 until the obtained correlation coefficient becomes R or approaches R within a predetermined error limit. If a video block that yields a correlation coefficient that is the same as R or approaches R within the predetermined error limit is found, the position of the found video block {(x0',y0'),(x1',y1')} is set as the position of a new masking block (S17). FIG. 7D shows a new masking block 703 which matches the initially set privacy protection area 702. As a result, the coordinates of the masking block are adjusted from {(x0,y0),(x1,y1)} to {(x0',y0'),(x1',y1')}.

The above operation is performed preferably at a predetermined interval and thus the position of the masking block is adjusted adaptively despite an unintended movement of the protection area caused by, e.g., natural factors or mechanical errors. The above operation can also be performed as needed or after a certain event (e.g., movement of the pan/tilter).

In another embodiment of the invention, the correlation is calculated using pixel data the luminance component of which is removed. In the case where the surveillance camera is installed at a public place wherein the luminous intensity is not constant, the undesirable effect of a change in the luminous intensity on the correlation can be prevented by removing the luminance component of the pixel data before calculating the correlation coefficient.

In yet another embodiment of the invention, the correlation is calculated using the high-frequency components of the luminance signal after removing the low-frequency luminance and chrominance signals to prevent the change in the luminous intensity from affecting the correlation. Because the high-frequency luminance data is obtained from the boundaries of objects, the high-frequency luminance data is used in the calculation of the correlation after normalization.

In another embodiment of the invention, the average (or medium) or standard deviation of the pixel values in the masking block is calculated and stored when the masking block is set initially. The average or standard deviation of pixel data in the same (or new) position on the video frame obtained at a predetermined interval is compared with the stored average or standard deviation value to determine if the current masking block matches the desired privacy protection area. The memory size for storing data and the amount of calculation for obtaining the correlation coefficient in the surveillance camera device can be minimized by storing and comparing a single value such as the average or standard deviation.

Figure 8:
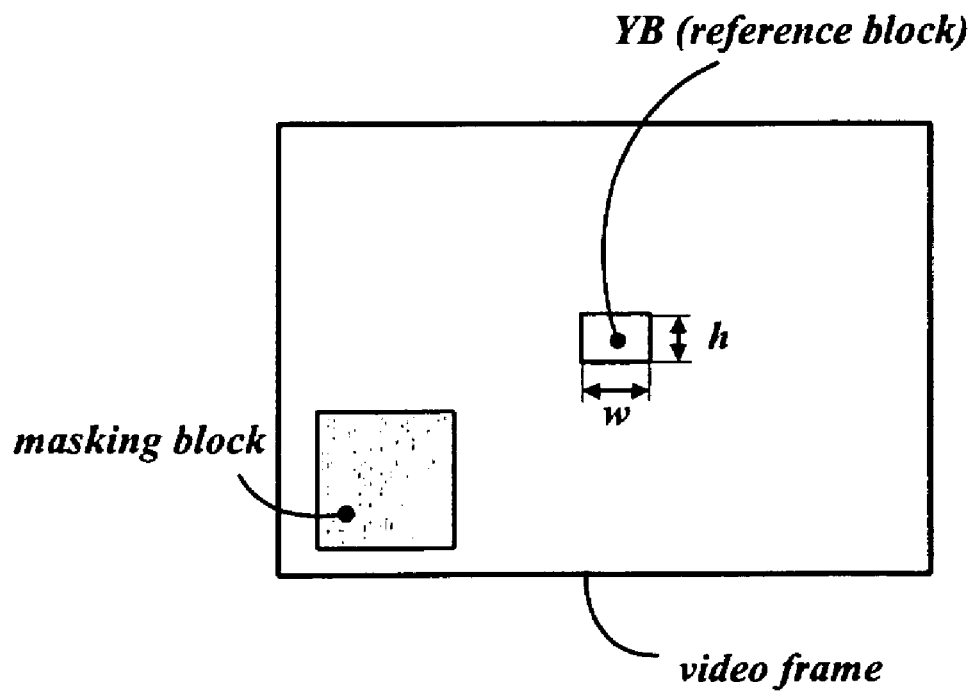
FIG. 8 illustrates an example of using a predetermined reference block for determining if the masking block does not match the privacy protection area in accordance with another embodiment of the invention.

In another embodiment of the invention, instead of calculating the correlation between current pixel data in the masking block and the pixel data stored in the memory 18, a reference block (or reference position/area) the position of which is fixed on the video frame is utilized. For example, a square-shaped reference block (YB) of a width w and a height h positioned in the center of the video frame as shown in FIG. 8 are used. The correlation between the initial pixel data in the reference block (YB) and the pixel data obtained afterwards from the same reference block (YB) is calculated to determine whether the desired surveillance protection area matches the set masking block. For instance, if the correlation between the previously obtained pixel data in the reference block and the recently obtained pixel data in the reference block is below a certain level, the microprocessor 15 determines the video frame has been deviated to an undesirable position. As a result, if it is determined the desired/initially-set protection area does not match the current masking block, the amount of mismatch (xd, yd) can be obtained by searching for a video block having the same pixel data as the initially obtained pixel data. If the amount of mismatch (xd, yd) is calculated, the position of the masking block is adjusted from {(x0,y0),(x1,y1)} to {(x0+xd,y0+yd),(x1+xd,y1+yd)}, i.e., based on the amount of mismatch. For instance, the reference block, instead of the masking block, may be used to determine a frame deviation in FIG. 6.

If a fixed reference block instead of a masking block is used for calculating the correlation, a variation of the amount of calculation caused by a change in the operator's setup can be avoided. In the embodiments where the masking block is used to determine a frame deviation, if the operator enlarges the masking block, the amount of calculation for obtaining the correlation coefficient and the memory space needed to store data can increase because the size of pixel data contained in the making block increases. In the embodiment shown in FIG. 8, however, the amount of calculation and the required memory space have nothing or little to do with the size of the masking block, which facilitates the surveillance camera design because a constant amount of calculation and memory size are maintained.

If the operator makes a request for canceling a preset masking (S18), the microprocessor 15 issues a command for stopping the masking operation to the masking unit 17 (or other unit performing the masking operation). Afterward, the entire video image taken with the surveillance camera is outputted without masking the protection area (S19). In another embodiment, the operator is requested to enter a password for stopping the masking operation and the masking operation stops only when the password provided by the operator matches a preset password.

In another embodiment of the invention, steps S12~S18 for the adaptive adjustment of the position of the masking block and the setup of a masking block are performed only during a predetermined time zone (e.g., between the noon and 4 pm). If the luminous intensity of video images taken during a day is greatly different from the luminous intensity of video images taken during night, the adaptive adjustment may be incorrect due to the variation of the luminous intensity. If the masking block is set during day, video images taken during the night tend to show low correlation. Such errors can be reduced by making the adaptive adjustment operation to be executed only in the predetermined time duration.

In yet another embodiment of the invention, steps S12~S18 for the adaptive adjustment of the position of the masking block are performed at predetermined time (e.g., at noon). If the surveillance camera is installed to take video images of a fixed location, the unintended movement of the protection area which may be caused by natural factors or mechanical errors may be very small. In this case, the mismatch between the protection area and the masking block can be adjusted without performing the adaptive adjustment operation frequently.

In step S11, capturing and storing of video data of the masking zone in the memory 18 may be performed at certain intervals or times and thus updated as needed, so that each newly obtained video data from the current masking/reference block is compared with the relevant stored video data.

In at least one of the embodiments described in detail makes it possible to precisely mask a privacy protection area despite natural factors or mechanical errors of the surveillance camera, thereby preventing video images taken from the privacy protection area from being exposed and therefore guaranteeing both surveillance and privacy protection.

While the invention has been disclosed with respect to a number of embodiments, those skilled in the art, having the benefit of this disclosure, will appreciate numerous modifications and variations therefrom. It is intended that all such modifications and variations fall within the spirit and scope of the invention.

What is claimed is:

1. A method for masking a surveillance image taken with a camera, comprising:
   (a) setting a masking zone corresponding to a protection area on a video frame being taken with the camera and obtaining initial video data from the set masking zone;
   (b) after a predetermined time, determining whether the masking zone is deviated from the protection area by calculating a correlation between the initial video data and video data obtained from the masking zone, wherein the correlation is calculated using high-frequency components of luminance signals of the initial video data and the video data obtained from the masking zone; and
   (c) adjusting a position of the masking zone on the video frame, if it is determined that the masking zone is deviated, by repeatedly searching a new masking zone on the video frame until the correlation between the initial video data and video data obtained from the new masking zone is less than a predetermined limit,
   wherein the new masking zone is obtained by moving the previous masking zone by a predetermined distance,
   wherein steps (b) and (c) are performed periodically, and
   wherein the correlation is a value determined based on:
      a sum of products of corresponding pixel values of two video data groups obtained from the masking zone at different times,
      an average of pixel values of the two video data groups, or
      a standard deviation of pixel values of the two video data groups.

2. The method of claim 1, wherein a shape of the masking zone is rectangular.

3. The method of claim 1, wherein the step (b) determines that the masking zone is deviated from the protection area if the calculated correlation is less than the threshold value.

4. The method of claim 1, wherein the step (b) uses partial components of the video data obtained from the masking zone to calculate the correlation.

5. The method of claim 1, further comprising:
   (d) re-adjusting the position of the masking zone on the video frame based on an amount of a horizontal and/or vertical movement of a view angle of the camera or based on a picture-taking magnification of the camera.

6. The method of claim 1, further comprising:
   (d) outputting the video frame being taken with the camera after blocking a video signal corresponding to the set masking zone.

7. A method for masking a surveillance image taken with a camera, comprising:
   (a) setting a masking zone corresponding to a protection area on a video frame being taken with the camera and obtaining initial video data from the set masking zone;
   (b) after a predetermined time, determining whether the masking zone is deviated from the protection area by calculating a correlation between the initial video data and video data obtained from the masking zone, wherein the correlation is calculated using high-frequency components of luminance signals of the initial video data and the video data obtained from the masking zone; and
   (c) adjusting a position of the masking zone on the video frame, if it is determined that the masking zone is deviated, by repeatedly searching a new masking zone on the video frame until the correlation between the initial video data and video data obtained from the new masking zone is less than a predetermined limit,
   wherein the new masking zone is obtained by moving the previous masking zone by a predetermined distance,
   wherein steps (b) and (c) are performed periodically, with the video data obtained from the masking zone being video data obtained from a predetermined reference zone of the masking zone, and
   wherein the correlation is a value determined based on:
      a sum of products of corresponding pixel values of two video data groups obtained from the masking zone at different times,
      an average of pixel values of the two video data groups, or
      a standard deviation of pixel values of the two video data groups.

8. The method of claim 7, wherein the step (b) determines that the masking zone is deviated from the protection area if the calculated correlation is less than the threshold value.

9. The method of claim 7, wherein the step (b) uses partial components of the video data obtained from the masking zone to calculate the correlation.

10. The method of claim 7, wherein a shape of the masking zone is rectangular.

11. The method of claim 7, further comprising:
    (d) re-adjusting the position of the masking zone on the video frame based on an amount of a horizontal and/or vertical movement of a view angle of the camera or based on a picture-taking magnification of the camera.

12. The method of claim 7, further comprising:
    (d) outputting the video frame being taken with the camera after blocking a video signal corresponding to the set masking zone.

13. An apparatus for masking a surveillance image taken with a camera, comprising:
    an opto-electric processing unit configured to convert an input optical ray into electrical video frames;
    a controller operatively connected to the opto-electric processing unit and configured to
       set a masking zone corresponding to a protection area on a video frame,
       obtain initial video data from the set masking zone,
       after a predetermined time, determine whether the masking zone is deviated from the protection area by calculating a correlation between the initial video data and video data obtained from the masking zone, wherein the correlation is calculated using high-frequency components of luminance signals of the initial video data and the video data obtained from the masking zone, and
       adjust a position of the masking zone on the video frame, if it is determined that the masking zone is deviated from the protection area, by repeatedly searching a new masking zone on the video frame until the correlation between the initial video data and video data obtained from the new masking zone is less than a predetermined limit,
    wherein the new masking zone is obtained by moving the previous masking zone by a predetermined distance; and a mask blocking unit configured to block the video signal corresponding to the set masking zone on the video frame, wherein the controller is configured to periodically determine whether the masking zone is deviated from the protection area by periodically calculating the correlation between the initial video data and video data obtained from the masking zone, and periodically adjust the position of the masking zone on the video frame if it is determined that the masking zone is deviated from the protection area, and wherein the correlation is a value determined based on:

a sum of products of corresponding pixel values of two video data groups obtained from the masking zone at different times, an average of pixel values of the two video data groups, or a standard deviation of pixel values of the two video data groups.

14. The apparatus of claim 13, wherein a shape of the masking zone is rectangular.

15. The apparatus of claim 13, wherein the controller is configured to determine that the masking zone is deviated from the protection area if the calculated correlation is less than the threshold value.

16. The apparatus of claim 13, wherein the controller is configured to use partial components of the video data obtained from the masking zone to calculate the correlation.

17. The apparatus of claim 13, further comprising:

a panning/tilting unit configured to adjust an optical axis of the opto-electric processing unit horizontally and/or vertically, wherein the controller is configured to re-adjust the position of the masking zone on the video frame based on an amount of the horizontal and/or vertical adjustment by the panning/tilting unit.

18. The apparatus of claim 13, wherein the controller is configured to re-adjust the position of the masking zone on the video frame based on a picture-taking magnification of the opto-electric processing unit.

19. An apparatus for masking a surveillance image taken with a camera, comprising:

an opto-electric processing unit configured to convert an input optical ray into electrical video frames;

a controller operatively connected to the opto-electric processing unit and configured to set a masking zone corresponding to a protection area on a video frame, obtain initial video data from the set masking zone, after a predetermined time, determine whether the masking zone is deviated from the protection area by calculating a correlation between the initial video data and video data obtained from the masking zone, wherein the correlation is calculated using high-frequency components of luminance signals of the initial video data and the video data obtained from the masking zone, and adjust a position of the masking zone on the video frame, if it is determined that the masking zone is deviated from the protection area, by repeatedly searching a new masking zone on the video frame until the correlation between the initial video data and video data obtained from the new masking zone is less than a predetermined limit, wherein the new masking zone is obtained by moving the previous masking zone by a predetermined distance; and a mask blocking unit configured to block the video signal corresponding to the set masking zone on the video frame, wherein the controller is configured to periodically determine whether the masking zone is deviated from the protection area by periodically calculating the correlation between the initial video data and video data obtained from a predetermined reference zone of the masking zone, and periodically adjust the position of the masking zone on the video frame if it is determined that the masking zone is deviated from the protection area, and wherein the correlation is a value determined based on:

a sum of products of corresponding pixel values of two video data groups obtained from the masking zone at different times, an average of pixel values of the two video data groups, or a standard deviation of pixel values of the two video data groups.

20. The apparatus of claim 19, wherein a shape of the reference zone is rectangular.

21. The apparatus of claim 19, wherein the controller is configured to determine that the masking zone is deviated from the protection area if the calculated correlation is less than the threshold value.

22. The apparatus of claim 19, wherein the controller is configured to use partial components of the video data obtained from the masking zone to calculate the correlation.

23. The apparatus of claim 19, further comprising:

a panning/tilting unit configured to adjust an optical axis of the opto-electric processing unit horizontally and/or vertically, wherein the controller is configured to re-adjust the position of the masking zone on the video frame based on an amount of the horizontal and/or vertical adjustment by the panning/tilting unit.

24. The apparatus of claim 19, wherein the controller is configured to re-adjust the position of the masking zone on the video frame based on a picture-taking magnification of the opto-electric processing unit.

* * * * *